United States Patent
Zhou et al.

(10) Patent No.: US 10,171,157 B2
(45) Date of Patent: Jan. 1, 2019

(54) REPEATER

(71) Applicant: DENSO CORPORATION, Kariya, Aichi-pref. (JP)

(72) Inventors: Zhuomin Zhou, Kariya (JP); Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/711,364

(22) Filed: Sep. 21, 2017

(65) Prior Publication Data

US 2018/0091214 A1    Mar. 29, 2018

(30) Foreign Application Priority Data

Sep. 26, 2016   (JP) .................. 2016-186889

(51) Int. Cl.
| | |
|---|---|
| *H04B 7/14* | (2006.01) |
| *H04L 12/751* | (2013.01) |
| *H04L 12/721* | (2013.01) |
| *H04L 12/741* | (2013.01) |
| *H04L 12/803* | (2013.01) |

(52) U.S. Cl.
CPC .............. *H04B 7/14* (2013.01); *H04L 45/02* (2013.01); *H04L 45/12* (2013.01); *H04L 45/66* (2013.01); *H04L 45/745* (2013.01); *H04L 47/125* (2013.01)

(58) Field of Classification Search
CPC ........... H04B 7/14; H04L 45/00; H04L 45/02; H04L 45/10; H04L 45/12; H04L 45/22; H04L 45/24; H04L 45/28; H04L 45/54; H04L 45/66; H04L 45/74; H04L 45/745; H04L 65/80; H04L 43/16; H04L 47/10; H04L 47/12; H04L 47/125; H04L 47/726; H04L 41/0213; H04L 49/25
See application file for complete search history.

(56) References Cited

U.S. PATENT DOCUMENTS

| | | | |
|---|---|---|---|
| 2003/0031126 A1 | 2/2003 | Mayweather et al. | |
| 2005/0169257 A1* | 8/2005 | Lahetkangas | ........... H04L 45/00 370/389 |

(Continued)

FOREIGN PATENT DOCUMENTS

JP    2013-046090 A    3/2013

*Primary Examiner* — Peter Chen
(74) *Attorney, Agent, or Firm* — Posz Law Group, PLC

(57) ABSTRACT

A repeater efficiently transfers frames addressed to the same destination address when the frames are received at the same time by a plurality of ports, by performing a distribute-transfer process, when a difference between a size of each of the frames received by a normal port and an average size of those frames is within a preset range for all the frames, or an actual-measured communication speed of each of two ring ports is greater than a threshold. The distribute-transfer process distributes and transmits the frames to two communication paths from the two ring ports after receiving the frames at the two normal ports. The highest actual-measured communication speed of a ring port among other ring ports of the repeaters is considered as a communication efficiency parameter for selecting a broadest communication path for transmitting the frame. The frame(s) having the highest communication speed is/are distributed to the ring port connected to the broadest path.

7 Claims, 5 Drawing Sheets

(56) References Cited

U.S. PATENT DOCUMENTS

2007/0291773 A1* 12/2007 Khan .................. G06F 9/505
                                                    370/401
2008/0107027 A1   5/2008 Allan et al.
2008/0205303 A1*  8/2008 Izumi ................ H04L 12/437
                                                    370/258
2015/0281055 A1* 10/2015 Lin .................... H04L 45/745
                                                    370/389

* cited by examiner

| P1 | | P2 | | P3 | P4 |
|---|---|---|---|---|---|
| MAC ADR | HOPS | MAC ADR | HOPS | MAC ADR | MAC ADR |
| AD23 | 1 | AD23 | 3 | AD21 | AD22 |
| AD24 | 1 | AD24 | 3 | | |
| AD25 | 2 | AD25 | 2 | | |
| AD26 | 2 | AD26 | 2 | | |
| AD27 | 3 | AD27 | 1 | | |
| AD28 | 3 | AD28 | 1 | | |

| | SEND SIDE | RCV SIDE |
|---|---|---|
| RELAY 11 → RELAY 12 | 50Mbps | 30Mbps |
| RELAY 12 → RELAY 13 | 80Mbps | 60Mbps |
| RELAY 13 → RELAY 14 | 40Mbps | 50Mbps |
| RELAY 14 → RELAY 11 | 20Mbps | 10Mbps |

REPEATER

CROSS REFERENCE TO RELATED APPLICATION

The present application is based on and claims the benefit of priority of Japanese Patent Application No. 2016-186889, filed on Sep. 26, 2016, the disclosure of which is incorporated herein by reference.

TECHNICAL FIELD

The present disclosure generally relates to a repeater that constitutes a communication network.

BACKGROUND INFORMATION

An Ethernet® network disclosed in patent document 1 describes a technique that implements a shortest path for transferring a frame between nodes. The shortest path is a path to an addressed node or a destination node, that has the minimum number of repeaters among other paths. The number of the repeaters on the path may be designated as a repeater count.

(Patent document 1) Japanese Patent Laid-Open No. 2010-509825

The repeater implementing the technique disclosed in the patent document 1 transmits all the frames having the same destination address on the same shortest path, when the frames addressed to the same destination address are received by a plurality of ports at the same time. As such, a traffic congestion of a specific communication path is likely to be caused, and the traffic congestion hinders efficient communication and transfer of the frames to the destination node.

SUMMARY

It is an object of the present disclosure to provide a repeater that efficiently transfers frames addressed to the same destination address to a destination node when the frames addressed to the same destination address are received at the same time by a plurality of ports.

In an aspect of the present disclosure, a repeater implementing a communication network includes a port section, a memory and a repeat processor.

The port section has a plurality of ports configured to transmit and receive frames.

The memory is configured to store communication efficiency information and connection information regarding each of repeaters on the communication network, wherein the communication efficiency information indicates a communication efficiency of each of the plurality of ports of the repeater and of each of a plurality of other ports associated with the communication nodes, and the connection information indicates connections among the communication nodes on the communication network.

The repeat processor is configured to retrieve a destination address of a frame received by the port section, to select one of the plurality of the ports of the port section to transmit the received frame, based on the destination address and the connection information stored in the memory, and to transmit the received frame from the selected port.

The repeat processor is further configured to perform a distribute-transfer process when a plurality of frames having a same destination address is received by the port section, by: defining a plurality of communication paths to the same destination address by referencing the connection information stored in the memory; selecting one or more of the plurality of communication paths as a broadest path based on a preset communication efficiency parameter, the communication efficiency information stored in the memory, and the connection information stored in the memory; selecting one communication path as the broadest path having a high communication efficiency when more than one of the plurality of communication paths are selected as the broadest path; and distributing one of the plurality of frames having the same destination address and having a highest communication speed to a port in connection with the broadest path.

Based on the above described configuration, the frames addressed to the same destination address and received at the same time by the plurality of ports are efficiently transferred.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiment of the present disclosure is described, with reference to the drawings.

1. Configuration

Figure 1:
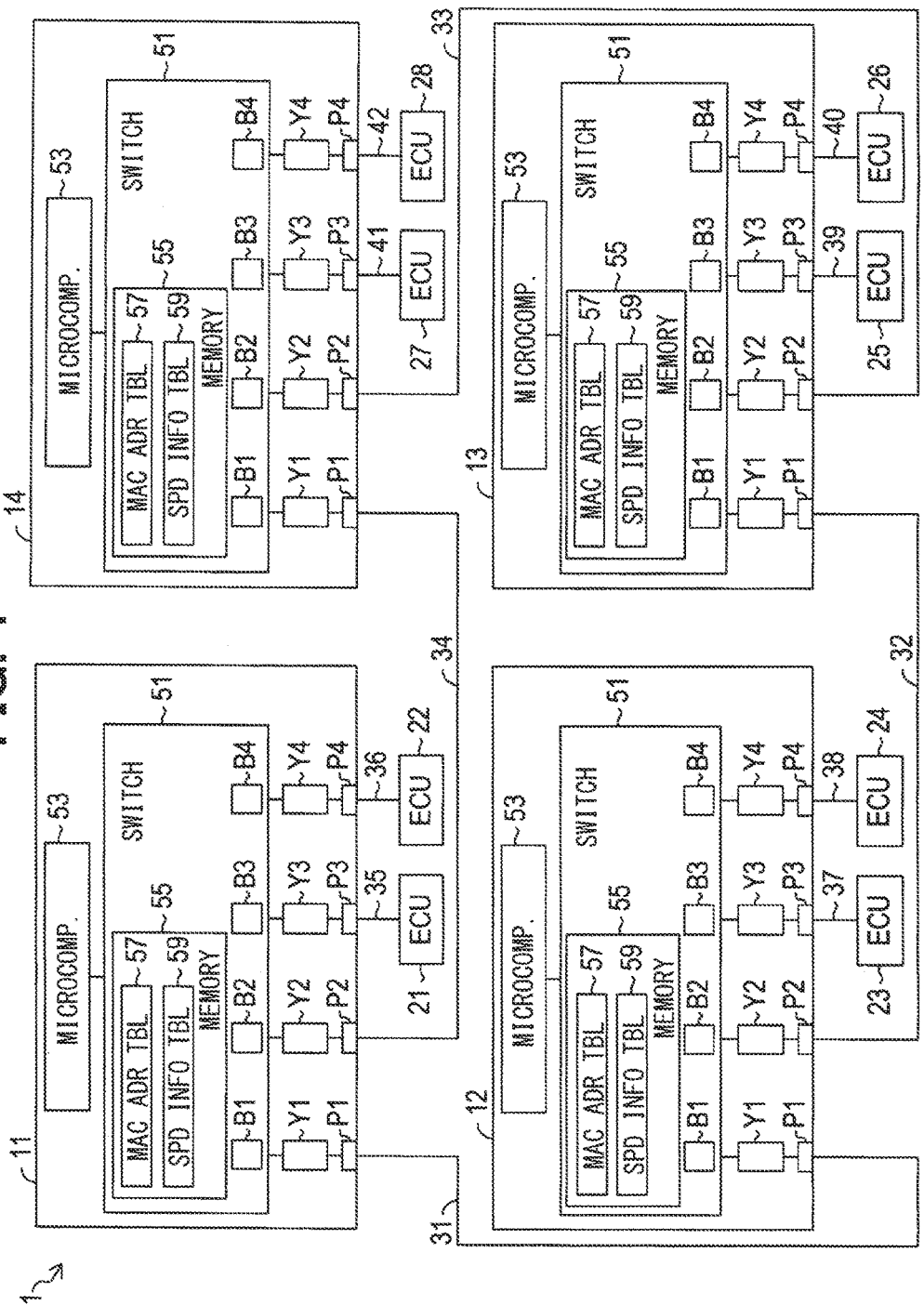
FIG. 1 is a block diagram of a configuration of a communication network.

A communication network 1 shown in FIG. 1 is an Ethernet network disposed, for example, in vehicles, such as a passenger car, and constitutes a vehicle communications system.

As shown in FIG. 1, the communication network 1 is provided with repeaters 11-14, ECUs 21-28, and communication lines 31-42. The term "ECU" is an abbreviation for Electronic Control Unit. The ECU enables the control of the network.

The repeaters 11-14 are configured with the functions of a network switch to relay communications between ECUs 21-28. The repeaters 11-14 are configured similarly and the following description focuses namely on the configuration of the repeater 11 for brevity. Like referenced components in each of the other repeaters 12, 13, and 14, are similar in structure and function to those described with regard to the repeater 11, unless described otherwise.

The repeater 11 is provided with four ports P1-P4. Each of the four ports P1-P4 may be used to transmit and receive frames. In networking, frames are a unit of data transmission. As used herein, a frame or frames may also be referred to as "data." The four ports P1-P4 constitute a port section.

The repeater 11 is provided with a switch 51. The switch 51 performs a repeater process that is a process for repeating, relaying, and retransmitting signals and data based on a networking standard, such as IEEE 802.3 and the like.

The repeater 11 is provided with a physical layer section Y1, Y2, Y3, and Y4. As used herein, the physical layer section may also be referred to as the "PHY" section, with a physical layer section referred to generally as Yi, where "i" represents a number 1 to 4. Yi has a corresponding port Pi with a like number from 1 to 4, for example, physical layer section Y2 corresponds to port P2 of the repeater 11, as shown in FIG. 1. The PHY section Yi includes hardware circuitry that provides the functionality of a transceiver.

The PHY section Yi is configured for a transmitting function that converts transmission data from the switch 51 into a communication signal for transmission over a communication line and outputs the communication signal to a port Pi corresponding to the PHY section Yi.

The PHY section Yi is configured for a receiving function that converts the communication signal input from a port Pi corresponding to the PHY section Yi to reception data, and outputs the reception data to the switch 51.

The switch 51 includes a buffer Bi for each port Pi. The correspondence of a buffer Bi to a port Pi follows the convention described above for PHY section Yi and port Pi. For example, buffer B3 corresponds to port P3 in the repeater 11, as shown in FIG. 1. Apart of the buffer Bi is used as a reception buffer in which the reception data is stored. Another part of the buffer Bi, i.e., a part other than the reception buffer, may be used as a transmission buffer in which the transmission data is stored.

The switch 51 includes a memory 55. The memory 55 stores a MAC address table 57 and a speed information table 59.

The MAC address table 57 may be used by the repeater 11 to select a shortest path for distributing a frame/data. For example, the repeater 11 may receive a data frame, use the MAC address table 57 to select a shortest path, and transmit the data frame via the shortest path. The shortest path is a communication path, among two or more paths, to a communication node (i.e., an ECU) to which frames having the same destination address are addressed and transmitted via the minimum number of the repeaters among the available paths. The details of the MAC address table 57 are described in greater detail below.

The speed information table 59 is used to select a broadest path, by which the received frame is distributed. The broadest path is a path, among two or more paths, having a highest communication speed. The details of the speed information table 59 are described in greater detail below.

Although the switch 51 is constituted by a digital circuit including many logical circuits, it may also be realized by a combination of a digital and analog circuitry. Further, the switch 51 may be constituted as a combination of a microcomputer having a CPU and a semiconductor memory, such as RAM, ROM, flash memory, and the like. In such case, various functions of the switch 51 may be realized by an execution of a program stored in a non-transitive and substantial memory medium by the CPU.

In the present example, the above-described semiconductor memory corresponds to the non-transitive substantial memory medium that may store the program. By executing the stored program, a method corresponding to the program may be performed by the switch 51 and other components of the repeater 11. The number of microcomputers included in the switch 51 may be one, or more than one.

The repeater 11 is also provided with a microcomputer 53 in addition to the switch 51. The microcomputer 53 configures various registers in the switch 51. For example, the microcomputer 53 may perform a setup operation to setup various registers in the switch 51. The registers (not shown) are configured to switch the operation mode of the switch.

In the communication network 1, the ports P1 and P2 of one repeater are connected to the ports P1 and P2 of other repeaters. That is, the port P1 of the repeater 11 and the port P1 of the repeater 12 are connected by a communication line 31. The port P2 of the repeater 12 and the port P1 of the repeater 13 are connected by a communication line 32. The port P2 of the repeater 13 and the port P2 of the repeater 14 are connected by a communication line 33. The port P1 of the repeater 14 and the port P2 of the repeater 11 are connected by a communication line 34.

The ECUs 21 and 22 are respectively connected to the ports P3 and P4 of the repeater 11, via communication lines 35 and 36. The ECUs 23 and 24 are respectively connected to the ports P3 and P4 of the repeater 12, via communication lines 37 and 38. The ECUs 25 and 26 are respectively connected to the ports P3 and P4 of the repeater 13, via communication lines 39 and 40. The ECUs 27 and 28 are respectively connected to the ports P3 and P4 of the repeater 14, via communication lines 41 and 42.

The repeaters 11-14 form a ring-shaped network by a connection of one repeater to another repeater at the P1 and P2 ports, as described above. From among the ports P1-P4 of each repeater, the ports P3 and P4 that are not used to form the ring-shaped network are connected to the ECUs 21-28 that serve as communication nodes.

Based on the ring-shaped communication network described above, a communication path among the repeaters 11-14, from one repeater to the other repeater, may be provided as a dual path, that is, two alternative communication paths. For example, a communication path from the repeater 11 to the repeater 14 includes a first path in a counterclockwise path that passes through both of repeaters 12 and 13 before reaching the repeater 14, and a second path in a clockwise direction that starts at the repeater 11 and ends at the repeater 14 without passing through any other repeaters.

Accordingly, based on the ring-shaped communication network, each of the repeaters 11, 12, 13, and 14 have two communication paths, for example, in a clockwise and counterclockwise direction. The two communication paths provide two communication routes between a first ECU 21-28 on a repeater 11-14 and a second ECU 21-28 on another repeater 11-14.

The ports P1 and P2 may be designated as "ring ports" used to form the ring-shaped network. Each ring port is a port that is connected to a ring port on another repeater. The ports P3 and P4 are not ring ports and may be designated as "normal ports." A normal port is a port that is connected to an ECU. In one repeater, the ring ports provide two communication paths for an ECU connected to a normal port of the one repeater to communicate with a destination ECU, i.e., a destination node, attached to the normal port of another repeater.

The MAC address table 57 of the repeater 11 may list and register, in a tabular format, the MAC addresses of each of devices, i.e., ECUs 21-28 that may communicate with the ports P1-P4 of the repeater 11.

When an ECU is designated as an ECUx, in which "x" represents a number, the MAC address of the ECUx is designated as "ADx" in the following description and in FIG. 2. For example, ECU 23 is designated by the MAC address AD23.

Figures 2, 3, 4:
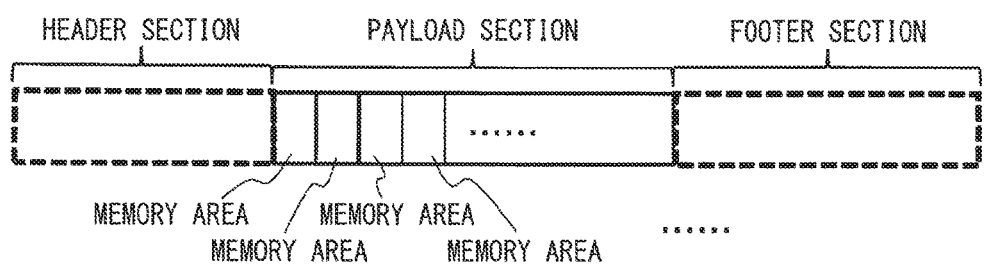
FIG. 2 is a table diagram of MAC addresses of the communication network.
FIG. 3 illustrates a speed information table.
FIG. 4 illustrates a ring frame.

As shown in FIG. 2, in the MAC address table 57 of the repeater 11, an address AD21 that is the MAC address of the ECU 21 is registered in a column of the port P3.

In the MAC address table 57, AD22 that is the MAC address of the ECU 22 is registered to the port P4, i.e., as shown in a column for port P4.

In the MAC address table 57, the MAC addresses AD23-AD28 of the ECUs 23-28 connected to the normal ports (P3 and P4) of the other repeaters 12, 13, and 14 are registered to the ring ports P1 and P2, because the ECUs 23-28 connect to the ring ports P1 and P2 of the repeater 11 via the other repeaters 12, 13, and 14.

The MAC address table 57 includes a repeater count as additional information for each MAC address listed in the columns of the ring ports P1 and P2.

The repeater count, or "HOPS," as the repeater count is referred to in the drawings, is the number of other repeaters a frame transmitted from the ring port may pass through to reach an addressed device. The addressed device in this case means an ECU having a MAC address with the relevant repeater count registered in the MAC address table 57.

For example, as shown in FIG. 2, in the MAC address table 57 of the repeater 11, the addresses AD23 and AD24 registered to the port P1 show a so repeater count of "1." This is because the ECUs 23 and 24, i.e., the ECUs respectively associated with MAC addresses AD23 and AD24, are connected to the repeater 12. A communication frame sent from port P1 travels via communication line 31 and is received by port P1 at the repeater 12. Accordingly, the communication frame passes through the repeater 12 before reaching ECUs 23 or 24, and thus a communication frame sent from port P1 of the repeater 11 to ECU 23 or ECU 24 shows a repeater count or "HOPS" of "1."

On the other hand, the addresses AD23 and AD24 associated with the port P2 show a repeater count or "HOPS" of "3." This is because three repeaters 12, 13, and, 14 exist, or are disposed, on a communication path, i.e., a clockwise communication path, from the port P2 of the repeater 11 to the ECU 23 or to the ECU 24. A communication frame sent from the port P2 on the repeater 11 and addressed to either the ECU 23 or the ECU 24 travels via a communication line 34 to a first repeater 14, is sent further via a communication line 33 to a second repeater 13, and is sent even further via communication line 32 to a third repeater 12, before finally reaching the ECUs 23 or 24. Thus, the communication frame passing through three different repeaters 12, 13, and 14 shows a HOP count of "3."

The MAC addresses and their associated repeater counts stored in the MAC address table 57 may also be referred to as "connection information." The connection information is information that indicates a connection relationship between the nodes in the communication network 1. The connection information is used by the repeat process. That is, when a frame is received by the port section, the switch 51 refers to the connection information stored in the memory 55 based on a destination address in the received frame, and selects one of the ports P1-P4 in the port section as a transfer destination of the received frame, to transmit the received frame from the selected port toward the destination address.

As shown in FIG. 3, the speed information table 59 in the repeater 11 lists and registers speed information for each of the ring ports in each of the repeaters 11-14. The speed information is information that indicates an actual-measured communication speed that is an actual measurement amount of communication traffic per unit time for a ring port.

The maximum value of the communication speed is set in advance for each of the communication paths, and the maximum value of the communication speed is an index of communication efficiency for the communication path. That is, the greater the actual-measured communication speed is, the more congested that communication path is.

The "speed information" may also be referred to as "communication efficiency information." The communication efficiency information is information about the communication efficiency of each of the ports P1-P4 on each of the repeaters 11-14.

With reference to FIG. 3, the speed information table 59 in the repeater 11 may be organized in tabular form to organize actual-measured communication speeds. For example, the actual-measured communication speeds from the repeater 11 to the repeater 12 show a communication speed of 50 Mbits/s for the port P1 (i.e., a ring port) of the repeater 11 on a sender side, labeled as "SEND SIDE" in FIG. 3, and an actual-measured communication speed of 30 Mbits/s for the port P1 (i.e., a ring port) of the repeater 12 on a receiver side, labeled as "RCV SIDE" in FIG. 3.

The maximum value of the communication speed of each ring port that can be registered to the speed information table 59 is set as 100 Mbits/s. The greater the value of the actual-measured communication speed of a ring port, the more congested the ring port is at the time of transmitting/receiving the frames, which means the lower the communication efficiency of the relevant ring port. In other words, actual-measured communication speed may define a degree of congestion at a given port, and "communication speed" may be understood as a "degree of congestion" at the given port. The speed information table 59 may provide an index, a sign, a level/degree of congestion of a ring port at the time of frame transmission/reception, instead of providing the actual-measured communication speed.

2. Process

Figure 5:
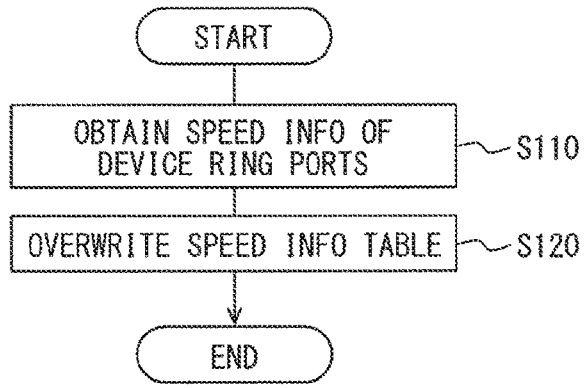
FIG. 5 is a flowchart of an update process.
Figure 6:
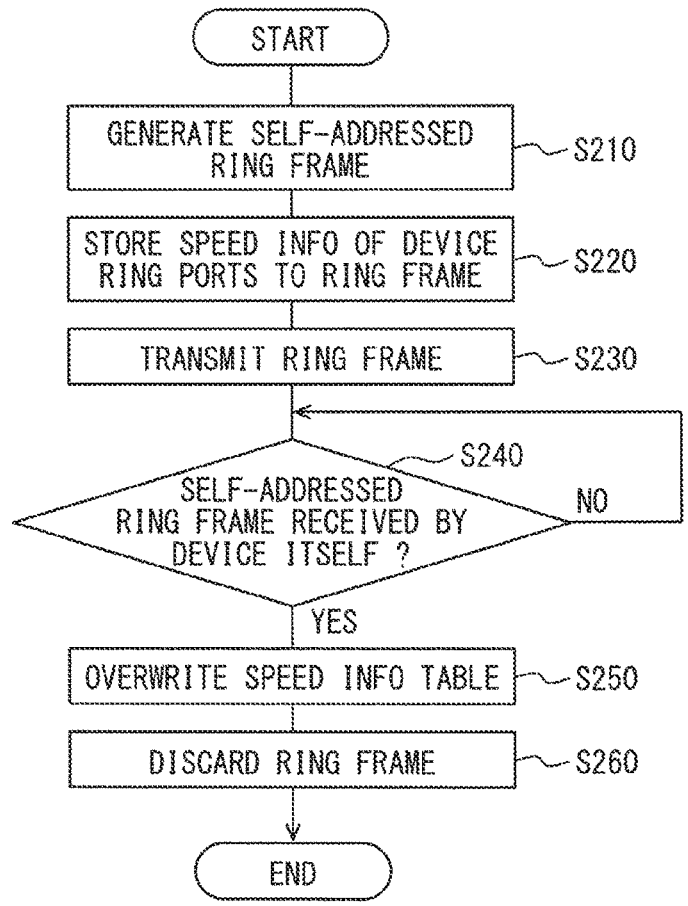
FIG. 6 is a flowchart of an update process.
Figure 7:
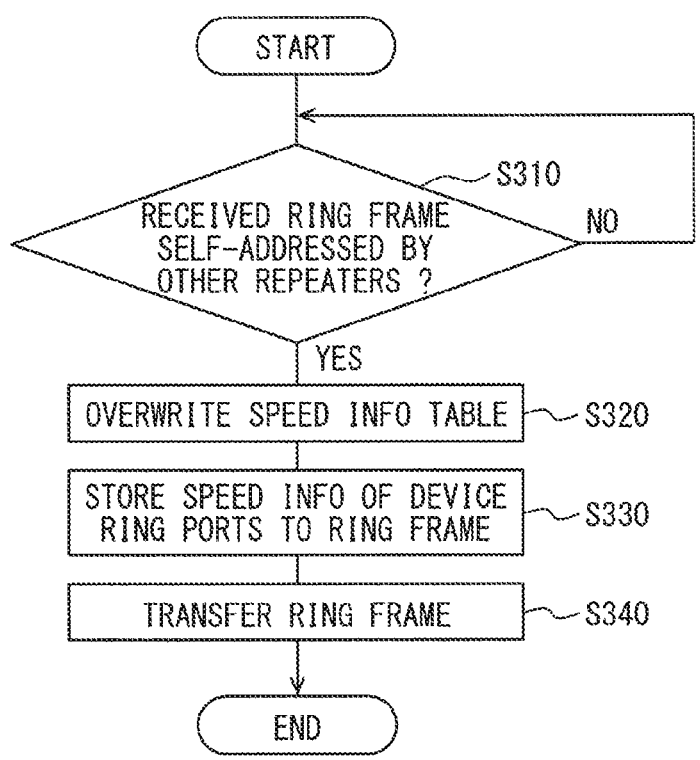
FIG. 7 is a flowchart of an update process.
Figure 8:
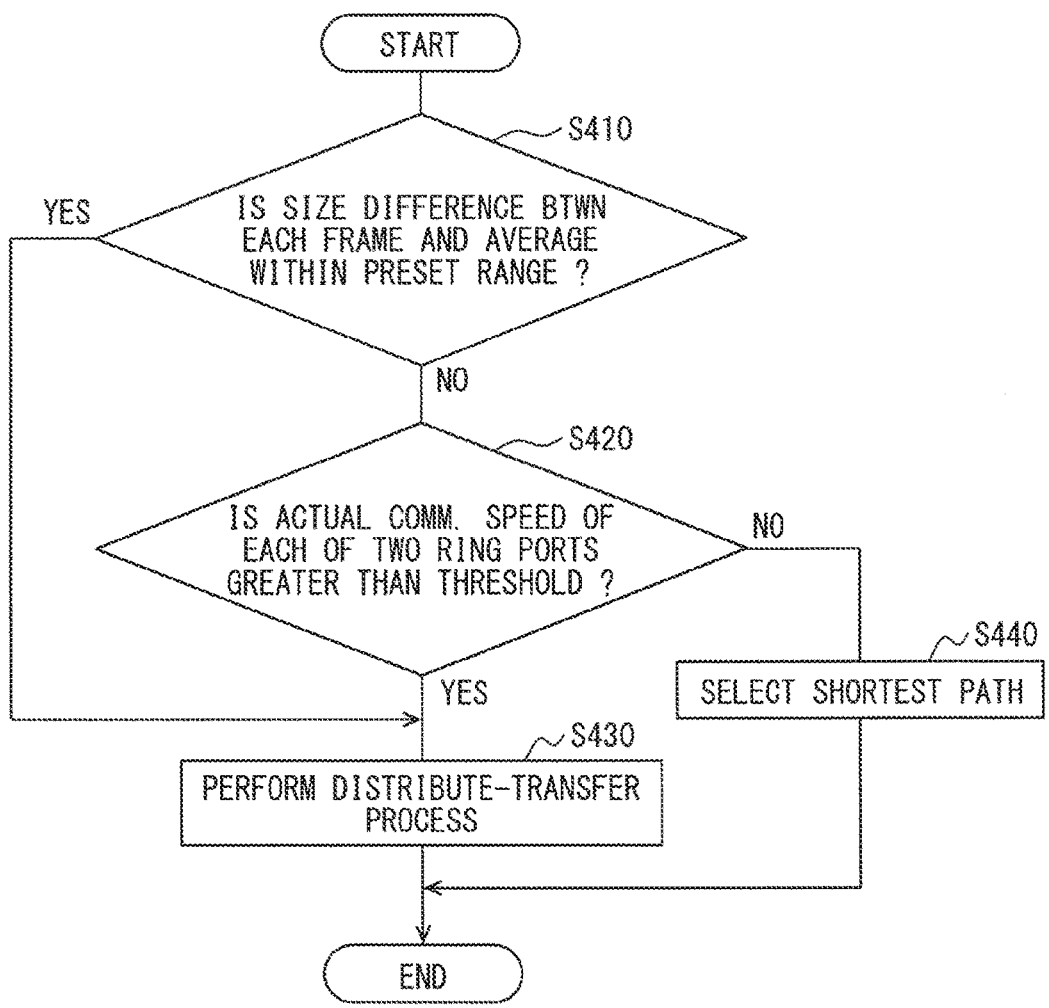
FIG. 8 is a flowchart of a distribution process.

The switch 51 of the repeater 11 performs a distribution process shown in FIG. 8 and update processes shown in FIGS. 5, 6, and 7, while performing other relaying/repeating/retransmission processes such as filtering processes and flooding processes based on a networking standard, such as Ethernet standard IEEE 802.3. The update processes shown in FIGS. 5-7 may be divided into different parts, that is, (part 1), (part 2), and (part 3), and may be referred to herein simply as the update processes (1), the update process (2), and the update process (3).

The update process (1) is a process that updates the speed information table 59 of a repeater to have the latest contents, by obtaining the speed information of each of the ring ports on a repeater, for example, the repeater 11.

The update process (2) is a process that updates the speed information table 59 of the repeater 11 to have the latest contents, by obtaining the speed information for the ring ports of each of the other repeaters 12-14 obtaining the speed information from the frame addressed to the repeater 11.

The update process (3) is a process that updates the speed information table 59 of the repeater 11 to have the latest contents, by obtaining the speed information for the ring ports of each of the other repeaters 12-14, obtaining the speed information from the frame addressed to one of the other repeaters 12-14.

The distribution process is a process that distributes the received frames. In other words, the distribution process is a process that distributes frames received by a repeater to different repeaters.

In the following description, the distribution process and the update processes (1), (2), and (3) are described with regard to the repeater 11. However, the other repeaters 12-14 may each perform the distribution process and the update processes (1), (2), and (3) in a similar manner.

[2-1. Update Process (1)]

The update process (1) that is performed by the switch 51 is described with reference to the flowchart in FIG. 5.

At S110, the switch 51 obtains the speed information of each of the two ring ports that are provided in the repeater 11, "DEVICE RING PORTS," as labeled in FIG. 5. More specifically, the switch 51 detects a total value of the size of the frames stored in the ring transmission buffers B1 and B2. Then, the switch 51 calculates an actual-measured communication speed of each ring port based on the detected total value of the frames stored in the ring transmission buffers B1 and B2. The switch 51 then obtains information that indicates the calculated actual-measured communication speed, and associates this information as the speed information that corresponds to each ring port P1 and P2. Then, the process proceeds to S120.

At S120, the switch 51 overwrites the speed information table 59 in the memory 55 with the obtained speed information. Then, the current cycle of the update process (1) is finished.

[2-2. Update Process (2)]

The update process (2) that is performed by the switch 51 is described with reference to the flowchart in FIG. 6.

At S210, the switch 51 generates a ring frame that is addressed to the repeater 11, itself. The ring frame is a kind of data transmitted and received in the communication network 1. The ring frame corresponds to a self-addressed update frame that is addressed to the repeater 11, itself.

As shown in FIG. 4, an example ring frame includes a header section, a payload section, and a footer section. The payload section includes memory areas in which the speed information for each ring port of each of the repeaters 11-14 is written. With continued reference to FIG. 6, after generating the self-addressed ring frame at S10, the process proceeds to S220.

At S220, the switch 51 reads the speed information for each of the two ring ports of the repeater 11 from the speed information table 59 stored in the memory 55, and the speed information read from the table 59 is stored in the ring frame generated at S210. Then, the process proceeds to S230.

At S230, the switch 51 transmits the ring frame with the speed information loaded at S220 from either of the two ring ports of the repeater 11. Then, the process proceeds to S240.

At S240, the switch 51 receives a frame that has been received by any of the two ring ports on the repeater 11. Then, the switch 51 determines whether the received frame is a ring frame addressed to the repeater 11. That is, switch 51 determines if the received frame is the self-addressed ring frame sent by the repeater 11 at S230.

If the switch 51 determines that the received frame is not the self-addressed ring frame addressed to the repeater 11 itself ("NO" at S240), S240 is performed again.

If the switch 51 determines that the received frame is the self-addressed ring frame that is addressed to the repeater 11 itself ("Yes" at 240), the process proceeds to S250.

At S250, the speed information table 59 in the memory 55 is overwritten by the speed information for each of the ring ports on the other repeaters 12-14. That is, the repeater 11 sends the self-addressed ring frame to the other repeaters 12, 13, and 14 in the ring, and the ring ports on each of the repeaters 12, 13, and 14 updates the ring frame with the speed information for each of the ring ports on each of the repeaters 12, 13, and 14. When the switch 51 of the repeater 11 receives the self-addressed ring frame, the speed information table 59 in the memory 55 of switch 51 on the repeater 11 is overwritten to update the speed information for the ring ports on each of the other repeaters 12, 13, and 14. Then, the process proceeds to S260.

At S260, the switch 51 discards the received ring frame. Then, the current cycle of the update process (2) is finished.

[2-3. Update Process (3)]

The update process (3) that is performed by the switch 51 is described with reference to a flowchart in FIG. 7.

At S310, the switch 51 receives a frame that has been received by any of the two ring ports on the repeater 11. The switch 51 then determines whether the received frame is a ring frame that is addressed to any one of the other repeaters 12-14. That is, the switch 51 determines if the received frame is a ring frame that has been self-addressed by any of the other repeaters 12, 13, and 14.

If the switch 51 determines that the received frame is not a ring frame that has been self-addressed by any of the other repeaters 12, 13, and 14, ("NO" at S310), S310 is performed again.

If the received frame is determined to be a ring frame that has been self-addressed by any one of the other repeaters 12, 13, and 14 ("YES" at S310), the process proceeds to S320.

At S320, the speed information table 59 in the memory 55 is overwritten by the speed information of each of the ring ports of each of the other repeaters 12-14 stored on the ring frame that is received by the switch 51. Then, the process proceeds to S330.

At S330, the switch 51 reads the speed information of each of the two ring ports of the repeater 11 from the speed information table 59 stored in the memory 55, and the speed information is written to the received ring frame, this process is shown as "STORE SPEED INFO OF DEVICE RING PORTS TO RING FRAME" at S330 of FIG. 7. Then, the process proceeds to S340.

At S340, the switch 51 transmits the ring frame with the speed information of each of the two ring ports of the repeater 11 from a different ring port than the ring port that initially received the ring frame at S310. That is, TRANSFER RING FRAME in S340 of FIG. 7 means that the ring frames received by the repeater 11 are received by one of the two ring ports P1 and P2 and transmitted from the other of the two ring ports P1 and P2 toward a destination repeater. Then, the current cycle of the update process (3) is finished.

[2-4. Distribution Process]

The distribution process that is performed by the switch 51 is described with reference to a flowchart in FIG. 8.

In Step S410, the switch 51 determines whether a difference between (i) a size of each of the frames received by the normal port and (ii) an average size of those frames is within a preset range.

When a difference between each frame size and the average frame size is determined to not be within the preset range for any one of the received frames ("NO" in S410), the process proceeds to S420.

When a difference between each frame size and the average frame size is determined to be within the preset range for all the received frames (YES in S410), the process proceeds to S430 and a distribute-transfer process is performed.

That is, when the variation between frame sizes is small, the transmission of the similar-sized frames via the same communication path may cause traffic congestion on the communication path. Therefore, to limit the congestion of the communication path, the frames are distributed among different communication paths. That is, at a repeater, for example the repeater 11, the frames are distributed for transmission among both rings ports P1 and P2 toward a destination to limit the congestion of a certain communication line, for example, communication lines 31 and 34.

At S420, the switch 51 determines whether the actual-measured communication speed of each of the two ring ports is greater than a threshold value that is set up in advance, i.e., a preset threshold. In other words, at S420, the switch 51 determines whether the actual-measured communication speed of the rings ports P1 and P2 is greater than a predetermined threshold.

When the actual-measured communication speed of each of the two ring ports is greater than the preset threshold value ("YES" at S420), the process proceeds to S430 and the distribute-transfer process is performed.

When the actual-measured communication speed of at least one ring port is determined to be lower than the threshold value ("NO" at S420), the process proceeds to S440.

At S430, as described above, the switch 51 performs the distribute-transfer process.

The distribute-transfer process is a process which distributively transfers the frames from the normal ports P3 and P4 to the two ring ports P1 and P2, in order to transmit the frames via two different communication paths to limit traffic congestion on any one communication line.

More specifically, the switch 51 sets up two or more communication paths to reach a destination address by referencing the connection information stored in the memory 55. In the present embodiment as shown in FIG. 1, two communication paths, a counterclockwise communication path and a clockwise communication path, are provided.

The switch 51 selects the broadest path by referencing the communication efficiency information and the connection information stored in the memory 55. That is, a communication path may be selected as the broadest path when a preset condition is fulfilled. The preset condition may be the highest actual-measured communication speed (i.e., degree of congestion) among the actual-measured communication speeds of all the ring ports on all the repeaters on a communication path is less than a threshold value.

In other words, by treating the actual-measured communication speeds of the ring ports as parameters of the communication efficiency of a communication path, and by selecting a communication path based on whether the communication speeds of the ring ports on a communication path are less than 50 Mbits/s, the broadest path may be selected based on the preset condition to transmit the frames at the highest communication speed and with the highest communication efficiency.

When a plurality of communication paths are selected as fulfilling the preset condition, one of the plurality of the communication paths having a relatively-small, or the smallest, actual-measured communication speed may be selected as the broadest path.

Then, the switch 51 distributes the frames addressed to the same destination address and having the highest communication speed to a ring port that is connected to the selected broadest path. In the present embodiment, the frames (i) addressed to the same destination and (ii) having the greatest data size may also be referred to as same-address frames or frames having the highest communication speed. For the rest of the frames addressed to the same destination address, the switch 51 distributes the frames to a ring port that is connected to a selected communication path that does not fulfill the above-described preset condition, or selected as having a relatively low actual-measured communication speed from among the two communication paths. Again, as described above, when the communication speed of a communications path is relatively high, the communications efficiency of the path is relatively low. In this case, communication speeds may be relative to 50 Mbits/s. That is, a relatively high communication speed may be a communication speed greater than 50 Mbits/s. After the switch 51 distributes the frames to the ring port not fulfilling the preset condition, the current cycle of the process is finished.

At S440, the switch 51 selects a shortest path by referencing the MAC address table 57 stored in the memory 55. Then, the switch 51 transmits all the frames addressed to the same destination to a ring port connected to the selected shortest path. The current cycle of the distribution process is then finished.

The components in the communications network 1 performing the update processes (1), (2), (3) may be collectively referred to as an "information updater." The information updater is configured to update the communication efficiency information by obtaining communication efficiency data for the plurality of other ports associated with the communication nodes. The components in the communications network 1 performing the processes S110 and S120 in the update process (1) may be referred to collectively as the "update performer." The update performer is configured to update, upon receiving the self-addressed update frame by one of the pair of ports, the communication efficiency information stored by the memory by using the data written in the received update frame. The update performer is further configured to update the communication efficiency information that is stored by the memory by using the data written in the update frame when the update frame transmitted by the other node is received by the pair of ports, when the pair of ports receives the update frame transmitted from the other node. The components in the communications network 1 performing the processes S210-S260 in the update process (2) may be collectively referred to as a "transmitter." The components of the communication network 1 performing the processes S310-S340 in the update process (3) may be collectively referred to as a "transferer." The transferer is configured to transfer the self-addressed update frame to the other of a pair of ports that did not receive the self-addressed update frame by writing the communication efficiency date of the pair of ports to the received update frame. The components of the communication network 1 performing the processes S410-S440 in the distribution process may be referred to collectively as a "repeat processor".

4. Effects

The following effects may be realized and achieved using the communication network 1 as described herein.

That is, the frames addressed to the same destination and simultaneously received by the plurality of ports, that is, the frames addressed to the same device, are transmitted more efficiently using the communication network 1 and processes described above.

More practically, the speed information stored by the memory 55 is always kept up-to-date, and the selection of a communications path is based on the highest communication efficiency by referencing the speed information stored by the memory 55.

For frames received by a repeater that are addressed to the same destination, the frames having the highest communication speed are distributed to a communication path having the highest communication efficiency.

By distributing these frames in such manner, the actual-measured communication speed of a communication path can be limited from reaching an upper limit value. Thus, a sum total of the actual-measured communication speeds of a plurality frames reaching the upper limit value of a communication path is reduced. That is, the communication network 1, described above, limits situations where the communication speed of the frames is restricted by an upper limit value of a communication path.

5. Other Embodiments

Embodiments of the present disclosure are not limited to the above-described configurations.

As described above, the repeaters 11-14 are each provided with two ring ports and the two ring ports are used to establish a ring shape communication network 1. However, the repeaters 11, 12, 13, and 14 may have additional ring ports other than the ports P1 and P2. The repeater 11 may establish other communication networks with repeaters other than 12, 13, and 14. Likewise, the repeaters 12, 13, and 14 may form new and different communication networks. The other communication network(s) may have a ring shape, or other shapes.

The present disclosure may be realizable not only using the above-described repeaters, but may also be realized as a program for operating a computer stored on a non-transitive, substantial memory medium.

Although the present disclosure has been fully described in connection with the above-described embodiments and with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A repeater for organizing a communication network, the repeater comprising:
   a port section having a plurality of ports, the port section configured to transmit and receive frames;
   a memory configured to store communication efficiency information and connection information for each of a plurality of communication nodes on the communication network; and
   a repeat processor configured
     to retrieve a destination address of a frame received by the port section,
     to select one of the plurality of the ports of the port section to transmit the received frame based on the destination address and the connection information stored in the memory, and
     to transmit the received frame from the selected port, wherein
   the repeat processor is further configured to perform a distribute-transfer process when a plurality of frames having a same destination address is received by the port section, by
     defining a plurality of communication paths to the same destination address by referencing the connection information stored in the memory,
     selecting one or more of the plurality of communication paths as a broadest path based on a preset communication efficiency parameter, the communication efficiency information stored in the memory, and the connection information stored in the memory,
     selecting one communication path as the broadest path having a high communication efficiency when more than one of the plurality of communication paths are selected as the broadest path,
     distributing one of the plurality of frames having the same destination address and having a highest communication speed to a port in connection with the broadest path, wherein
   the communication efficiency information indicates a communication efficiency of each of the plurality of ports of the repeater and of each of a plurality of other ports associated with the communication nodes, and wherein
   the connection information indicates connections among the communication nodes on the communication network.

2. The repeater of claim 1, wherein
   the repeat processor is further configured to perform the distribute-transfer process when a difference between (i) a size of a frame addressed to the same destination address and (ii) an average size of the plurality of frames having the same destination address, is determined to be within a preset range.

3. The repeater of claim 1, wherein
   the repeat processor is further configured to perform the distribute-transfer process when the communication efficiency of each of a plurality of ring ports connected to the plurality of communication paths is greater than a preset threshold.

4. The repeater of claim 1, wherein
   the repeat processor is further configured to perform the distribute-transfer process by distributing the plurality of frames having the same destination address and not having the highest communication speed to a port not connected to the broadest path.

5. The repeater of claim 1 further comprising:
   an information updater configured to update the communication efficiency information by obtaining communication efficiency data for the plurality of other ports associated with the communication nodes, wherein
   the communication network is organized as a ring-shaped network, and
   the information updater includes:
     a transmitter configured to transmit from one of a pair of ports on the repeater, a self-addressed update frame that includes the communication efficiency data about the pair of ports on the repeater;
     a transferer configured to transfer the self-addressed update frame to the other one of the pair of ports other than the receiving port by writing the communication efficiency data of the pair of ports to the received update frame, upon receiving the update frame that is transmitted from another node by one of the pair of ports; and
     an update performer updating, upon receiving the self-addressed update frame by one of the pair of ports, the communication efficiency information stored by the memory by using the data written in the received update frame.

6. The repeater of claim 5, wherein
   the update performer updates, upon receiving by the pair of ports the update frame that is transmitted from the other node, the communication efficiency information stored by the memory by using the data written in the update frame when the update frame transmitted by the other node is received by the pair of ports.

7. The repeater of claim 1, wherein
the memory stores a table with information indicating a
   relationship between the ports and the communication
   efficiency information.

\* \* \* \* \*